July 25, 1933.  A. C. LINDGREN ET AL  1,919,339
TANK FOR CORN PICKERS
Filed Feb. 21, 1930   4 Sheets-Sheet 1

Inventors
A.C. Lindgren
C.R. Raney
and R.B. Hitchcock
By N.P. Doolittle
Atty.

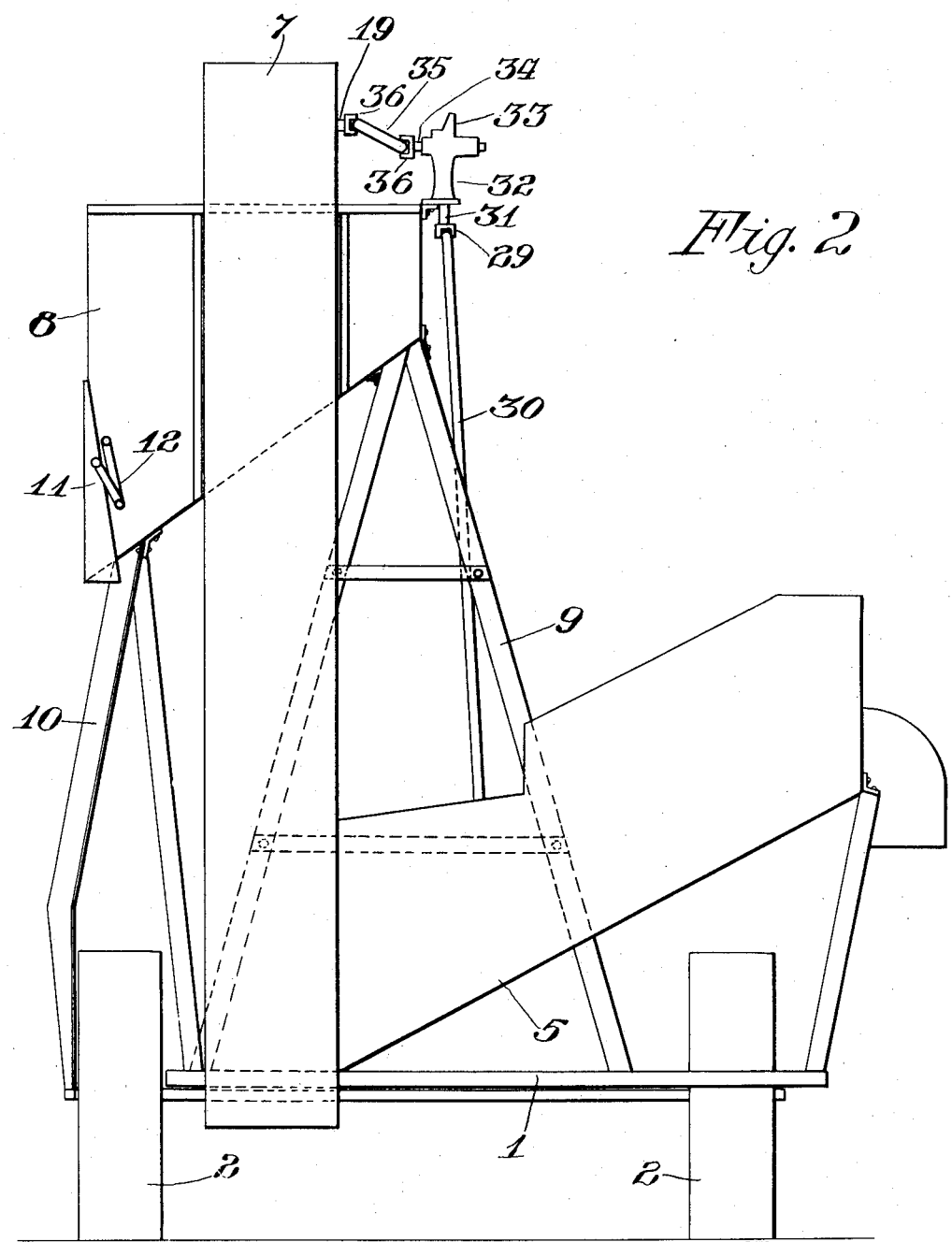

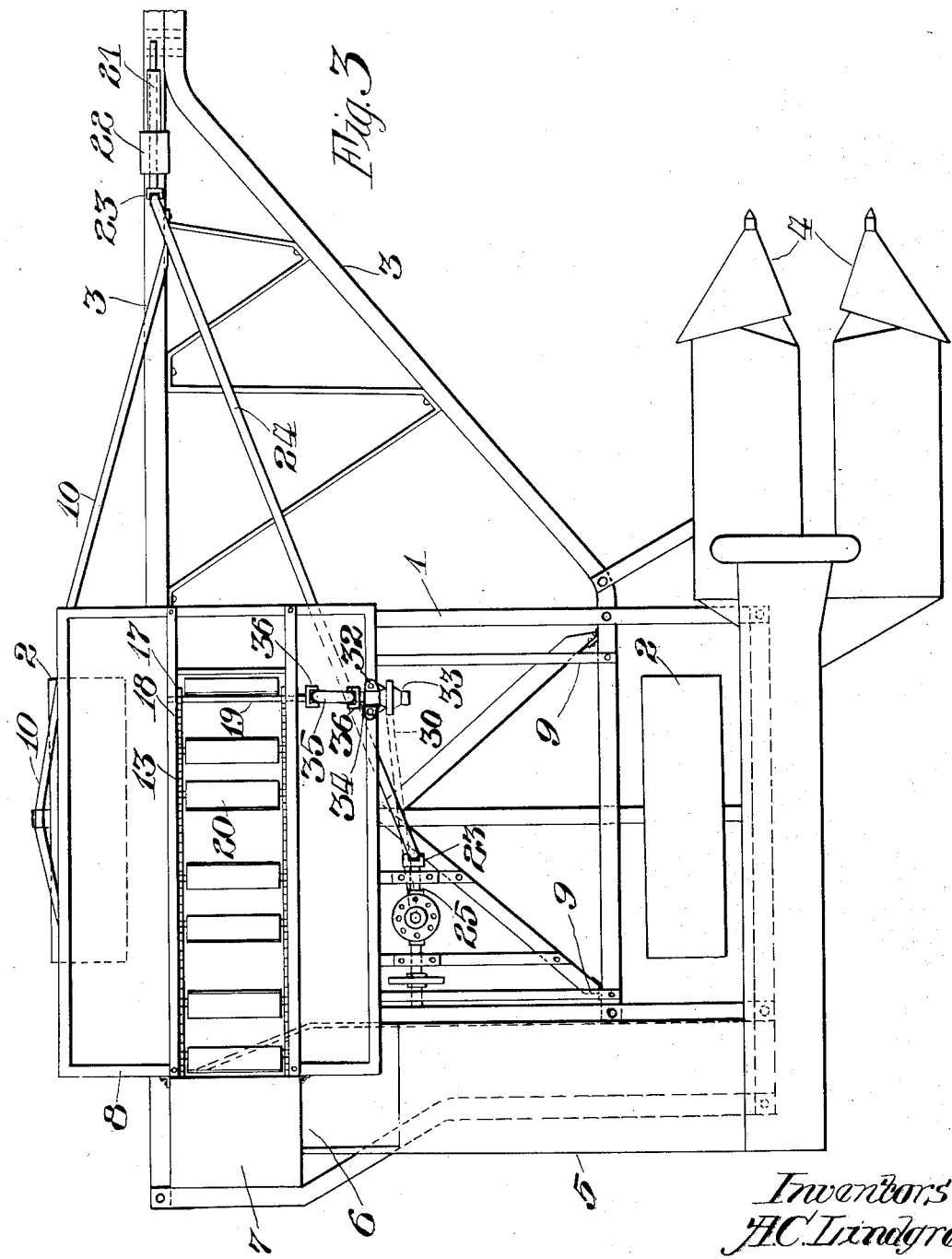

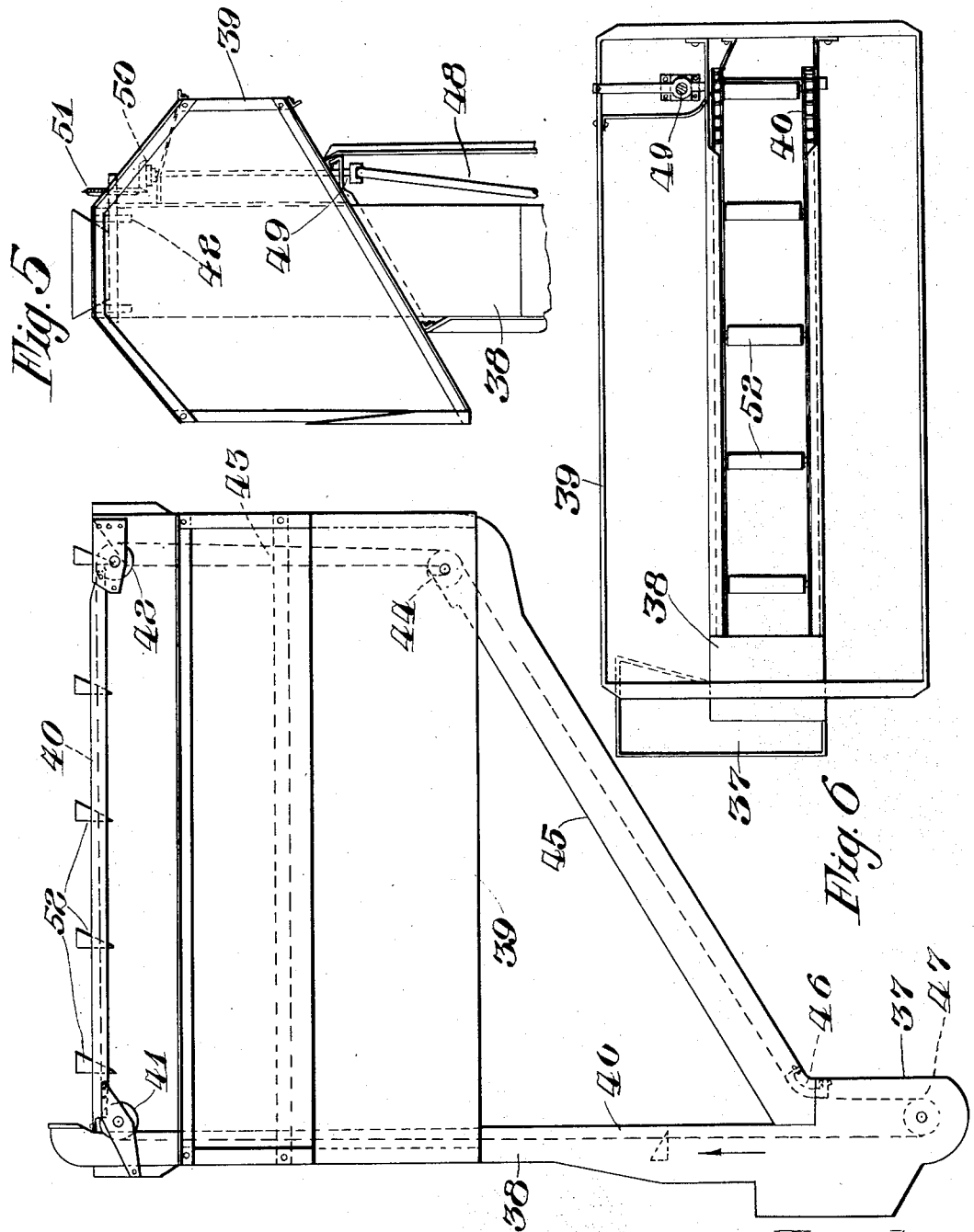

Patented July 25, 1933

1,919,339

UNITED STATES PATENT OFFICE

ALEXUS C. LINDGREN, OF CHICAGO, CLEMMA R. RANEY, OF RIVERSIDE, AND REX B. HITCHCOCK, OF CHICAGO, ILLINOIS, ASSIGNORS TO INTERNATIONAL HARVESTER COMPANY, A CORPORATION OF NEW JERSEY

TANK FOR CORN PICKERS

Application filed February 21, 1930. Serial No. 430,172.

This invention relates to a grain tank for corn pickers. More specifically it relates to improvements in a grain tank adapted to be mounted above a corn picker and to an elevator for delivering the grain to and distributing it in the tank.

The object of the invention is to construct such an improved tank and elevator and to provide a suitable drive from the tractor power take-off for operating the elevator. This and other objects, which will be apparent, are accomplished, as shown in the embodiments of the invention shown in the drawings and described in the following detailed description.

In the drawings:

Figure 2 is an end elevation of the same device shown in Figure 1;

Figure 3 is a plan view showing the top of the grain tank and the elevator mechanism;

Figures 4, 5 and 6 show a modification of the device.

Figure 4 is a side elevation showing diagrammatically a modification in which the elevator conveyor encircles the grain tank;

Figure 5 is an end elevation of the structure shown in Figure 4; and,

Figure 6 is a top plan view of the structure shown in Figure 4.

Figure 1:
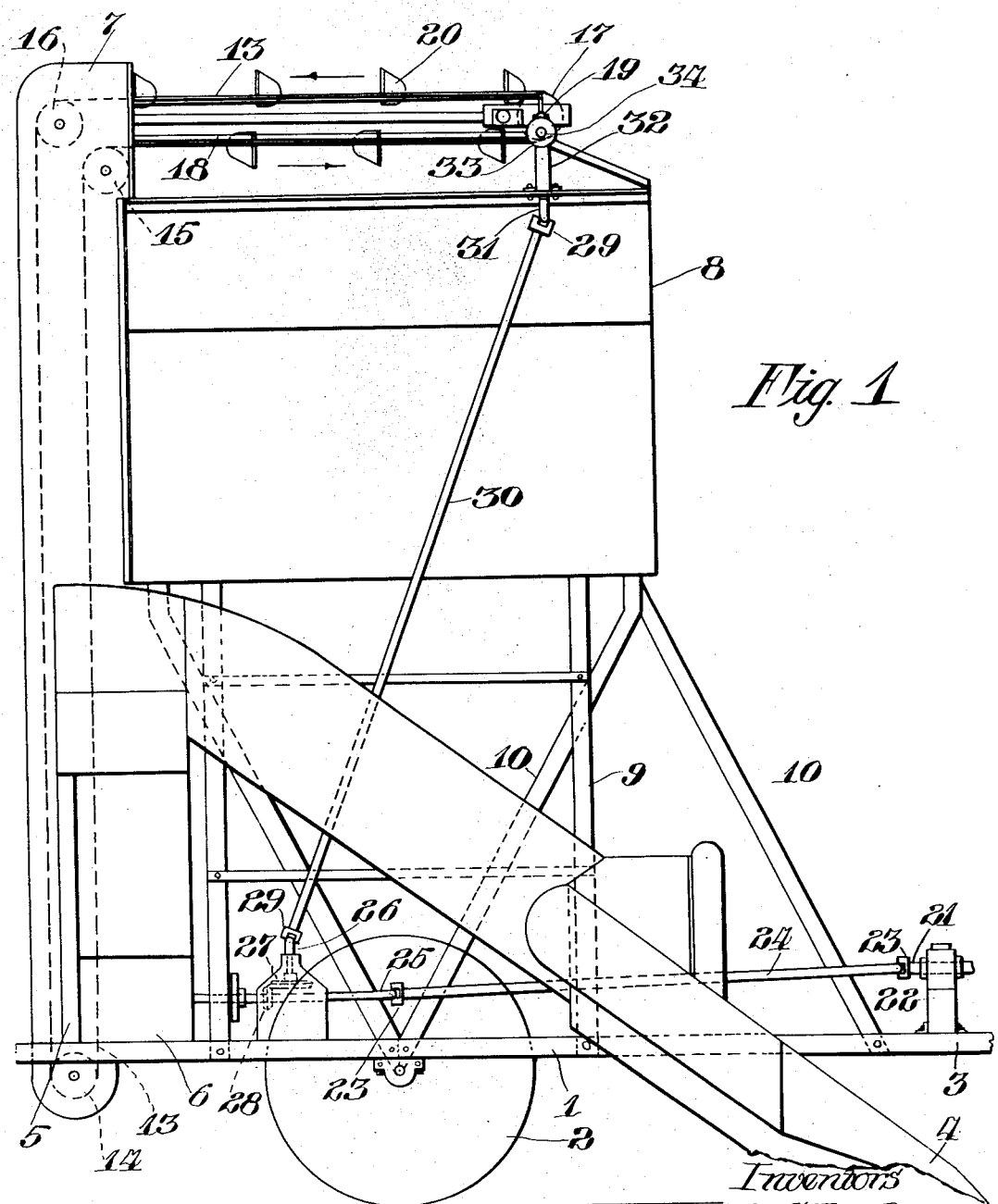
Figure 1 is a side elevation, showing in outline a corn picker with the tank and elevator of this invention in position, and the power drive shafts and gearing.

The grain tank and elevator of this invention may be attached to any corn picker or similar machine to which it is adaptable. In the drawings, Figures 1, 2 and 3, it has been shown attached to a corn picker of a conventional design having a main horizontal frame 1, which is mounted on wheels 2 and is adapted to be drawn by a tractor attached to draft members 3 extending forwardly from the frame. The corn picker 4 is mounted on the frame at one side. The particular construction of the corn picker is not a part of this invention and will be referred to only as a single element of the structure. The corn picker is provided with a delivery chute 5 through which the grain is delivered. The delivery chute terminates in a grain box 6 positioned at the bottom of the vertical elevator shaft 7.

The elevator shaft 7 extends upwardly to a point above a grain tank 8, which is securely mounted and braced in position at wagon height above the frame 1. The tank may be mounted on suitable vertical uprights 9 and braced in position by angularly extending members 10.

The grain tank has a suitable capacity, preferably about a wagon load, and is provided with a pivoted drop door 11. The door 11 is hinged on the tank at the bottom and is provided with links 12, which limit its downward movement to provide a sloping chute for delivery of grain from the grain tank to a wagon, which is driven alongside the tank.

An endless conveyor 13 extends up the elevator shaft and over suitable rolling supports. At the bottom of the elevator shaft in the grain receiving box a sprocket roller 14 is mounted for rotation on a horizontal axis. At the top of the elevator shaft two similar rollers 15 and 16 are pivoted in a similar manner, the roller 16 being positioned vertically above the roller 15 and rearwardly therefrom for a purpose to be hereinafter described.

Near the forward end of the grain tank opposite the delivery end of the elevator shaft 7, a sprocket roller 17 is rotatably mounted on spaced angle bars 18, which extend longitudinally of the grain tank from the elevator shaft to the opposite end. A shaft 19 extends horizontally from the roller 17 to provide means for driving the roller and the endless conveyor which extends over it.

The endless conveyor 13 is of the chain and bucket type. The buckets 20 are positioned on the conveyor in such a manner as to scoop up grain from the delivery box 6 at the bottom of the elevator shaft and convey it upwardly. The conveyor extends horizontally over the top of the grain tank from the roller 15 to the driving roller 17 with the portion of the conveyor adjacent the top of the tank adapted to move in a direction away from the top or delivery end of the elevator shaft. The conveyor extends over the drive roller 17 horizontally toward the top of the elevator shaft and over the roller 16 downwardly to the lower roller 14 in the grain box.

As clearly shown in Figure 1, the shaft 21 mounted in a suitable bearing support 22 is adapted to be driven by the power take-off connection of a tractor by which the corn picker is drawn.

Through suitable universal joints 23 and a shaft 24 power is transmitted to a horizontal shaft 25 for driving the corn picking mechanism. By means of a vertical shaft 26 and bevel gears 27 and 28, a vertical drive shaft is provided for actuating the conveyor mechanism. By means of suitable universal joints 29 and an upwardly extending shaft 30, power is transmitted to a vertical shaft 31 suitably mounted in a bearing bracket 32 at the top of the grain tank. Through bevel gears provided in a housing 33 integrally with the bearing bracket 32, a horizontal drive shaft 34 is provided for actuating the drive roller 17 through a shaft 35 provided with suitable universal joints 36.

In the operation of this device, the picker is drawn by a tractor provided with a power take-off. Power for driving the picking mechanism is transmitted through the shafts 21, 24 and 25. The ears of corn removed from the stalks by the picking mechanism is delivered through the chute 5 into the grain box 6 at the base of the elevator shaft 7.

The buckets 20 on the endless conveyor 13 carry the grain vertically up the elevator shaft and deliver it into the grain tank 8 as soon as the conveyor turns horizontally over the roller 15 at the top of the elevator shaft. It will be seen that the grain will pile up in the end of the grain tank 8 adjacent the elevator shaft. However, when an amount of grain has been delivered to the tank sufficient to fill the end adjacent the elevator shaft and pile up at that end, the conveyor buckets moving along the horizontal portion of the conveyor act as a leveling and distributing means and drag the grain toward the opposite end of the tank so that its full capacity may be utilized before emptying the tank.

The power for driving the endless conveyor is transmitted through the shafts 26, 30, 31 and 35 to the shaft 19 of the drive roller. It is preferable to drive the conveyor from the upper end, as a more direct drive is thus obtained without an undue tension on the endless conveyor 13.

In the modification shown in Figures 4, 5 and 6, the conveyor encircles the grain tank. A grain receiving box 37 is similarly positioned on a picker frame to the box 6 shown in the form described in detail. An elevator shaft 38 extends vertically from the grain box 37 to a position above a grain tank 39.

An endless conveyor 40 extends up the elevator shaft 38, over a roller 41 at the top of the tank, and horizontally along the top of the tank to the end opposite the elevator shaft. A drive roller 42 is provided at said end of the grain tank. A shaft 43 extends vertically through the grain tank 39 below the roller 42. At the bottom of the shaft 43 a guide roller 44 is pivoted on a horizontal axis. A shaft 45 completes the elevator housing extending from the bottom of the shaft 43 to the grain box 37. A bearing surface 46 is provided at the junction of the shaft 45 with the grain box 37. At the bottom of the grain box a roller 47, over which the conveyor extends, is pivoted on a horizontal axis.

Driving means consisting of vertically extending shafts 48, 49 and bevel gears 50 and 51 are provided for rotating the roller 42, thereby driving the endless conveyor 40. The operation of this form of the device is substantially the same as that of the form shown in Figures 1, 2 and 3, previously described in detail. The grain is delivered into the receiving box 37 by the picker mechanism and is carried vertically up the shaft 38 by the bucket 52 on the endless conveyor 40. The grain is delivered into the end of the grain tank adjacent the elevator shaft and is evenly distributed toward the other end of the tank when the grain has piled up to the top of the tank.

It is to be understood that applicants have shown only certain preferable forms which the invention may take and that they limit themselves only by the scope of the appended claims.

What is claimed is:

1. In a corn picker attachment for tractors, a supporting frame mounted on a single wheeled axle and pivotally connected to the tractor, a grain tank mounted thereon, in a substantially balanced position over the axle, a picking unit mounted on the frame, a combined elevating and tank leveling means consisting of an endless conveyor extending upwardly from the picking unit to the tank and horizontally across the top of the tank, a drive shaft extending upwardly from the picker to the top of the tank adapted to drive the endless conveyor, and means operatively connecting said shaft with the picker operating mechanism.

2. The combination with a corn picker adapted to be drawn by a tractor, of a supporting frame mounted on a single wheel supported axle and pivotally connected to the tractor, a grain tank mounted on the picker at wagon height thereabove and substantially balanced over the axle, receiving means into which the picker delivers, an elevator shaft extending from said receiving means to a point above the grain tank, an endless conveyor mounted in said elevator and extending horizontally across the top of the grain tank, said conveyor being adapted to be continuously operated with the portion adjacent the top of the grain tank moving in a direction away from the elevator shaft, and means for driving the conveyor operatively connected to the picker mechanism drive.

3. The combination with a corn picker adapted to be drawn and operated by a tractor, of a supporting frame mounted on a single wheel supported axle and pivotally connected to the tractor, a grain tank mounted on the picker at wagon height thereabove and substantially balanced over the axle, grain receiving means into which the picker delivers, an elevator extending from said means to a point above the grain tank, a rotatable conveyor support at the bottom of the elevator shaft, conveyor supports at the top of the elevator shaft, a conveyor support at the end of the grain tank opposite the elevator shaft, an endless conveyor extending over said supports, and means for operating the conveyor.

4. In a grain harvesting machine, a carrying frame provided with a single transverse wheel supported axle, a grain tank mounted on the machine at wagon height thereabove, said tank being substantially balanced over said axle, a conveyor for elevating grain to said tank, and means for leveling the grain in said tank, said leveling means being a continuation of the elevating conveyor.

5. A corn picker adapted to be drawn and operated by a tractor comprising in combination with the tractor, a supporting frame mounted on a single wheeled axle and pivotally connected to the tractor, picking mechanism mounted on said frame, a grain tank mounted on the frame at wagon height thereabove, said tank being substantially balanced over said axle, means for elevating grain from the picker to the tank, and means for leveling the grain in the tank.

In testimony whereof we affix our signatures.

ALEXUS C. LINDGREN.
CLEMMA R. RANEY.
REX B. HITCHCOCK.